G. H. WILLIAMS.
ORE JIG.
APPLICATION FILED APR. 1, 1910.
976,419.
Patented Nov. 22, 1910.
3 SHEETS—SHEET 1.
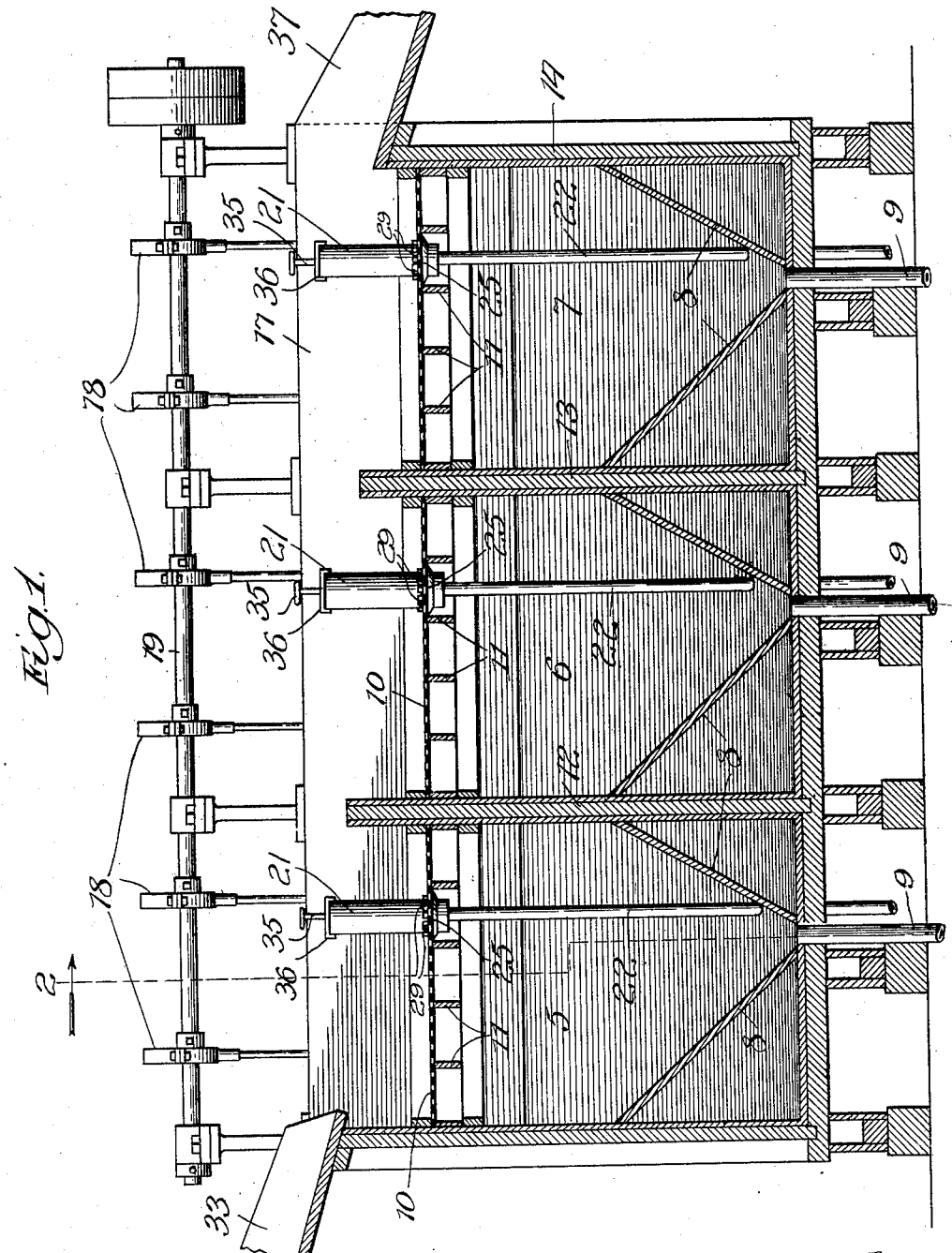

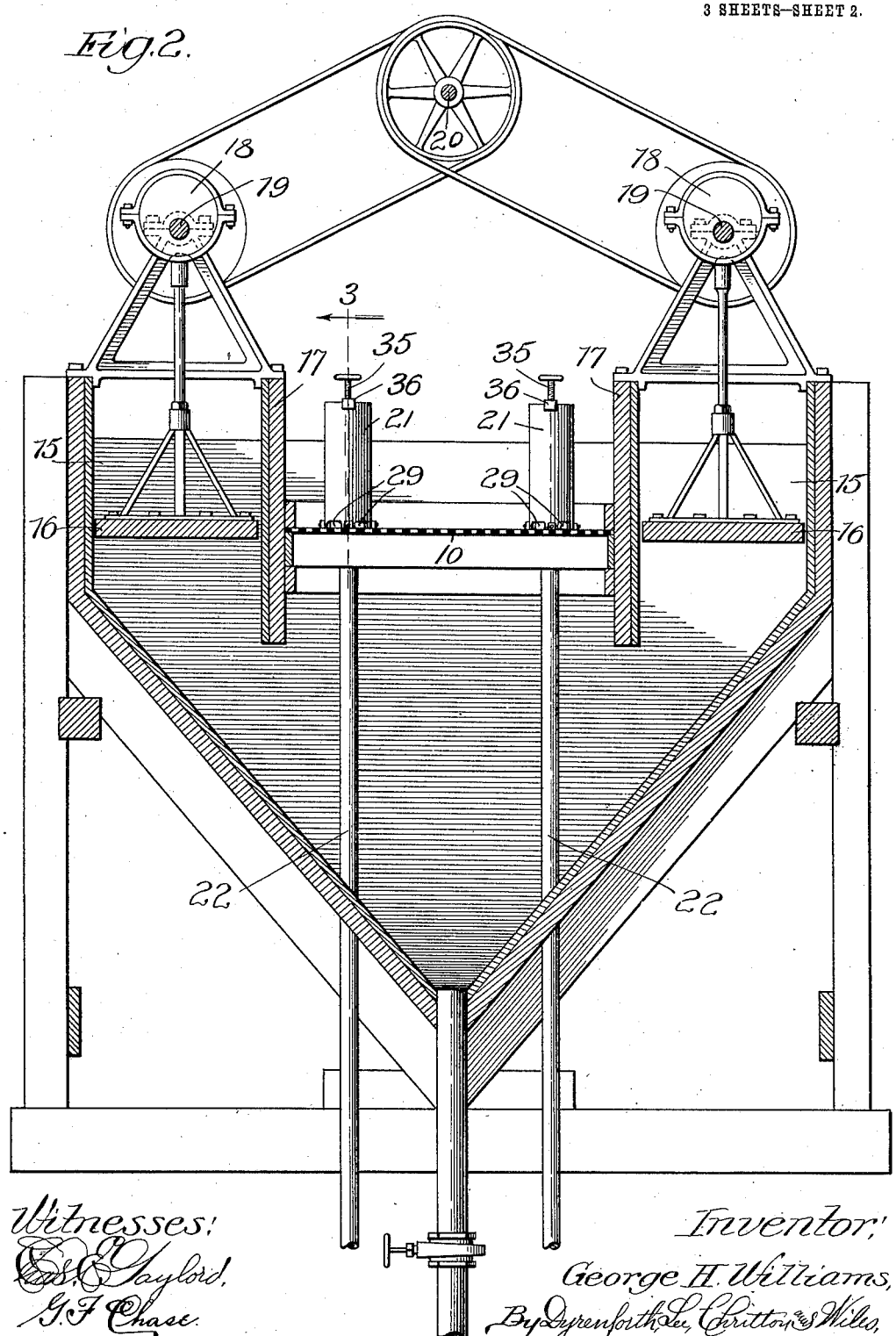

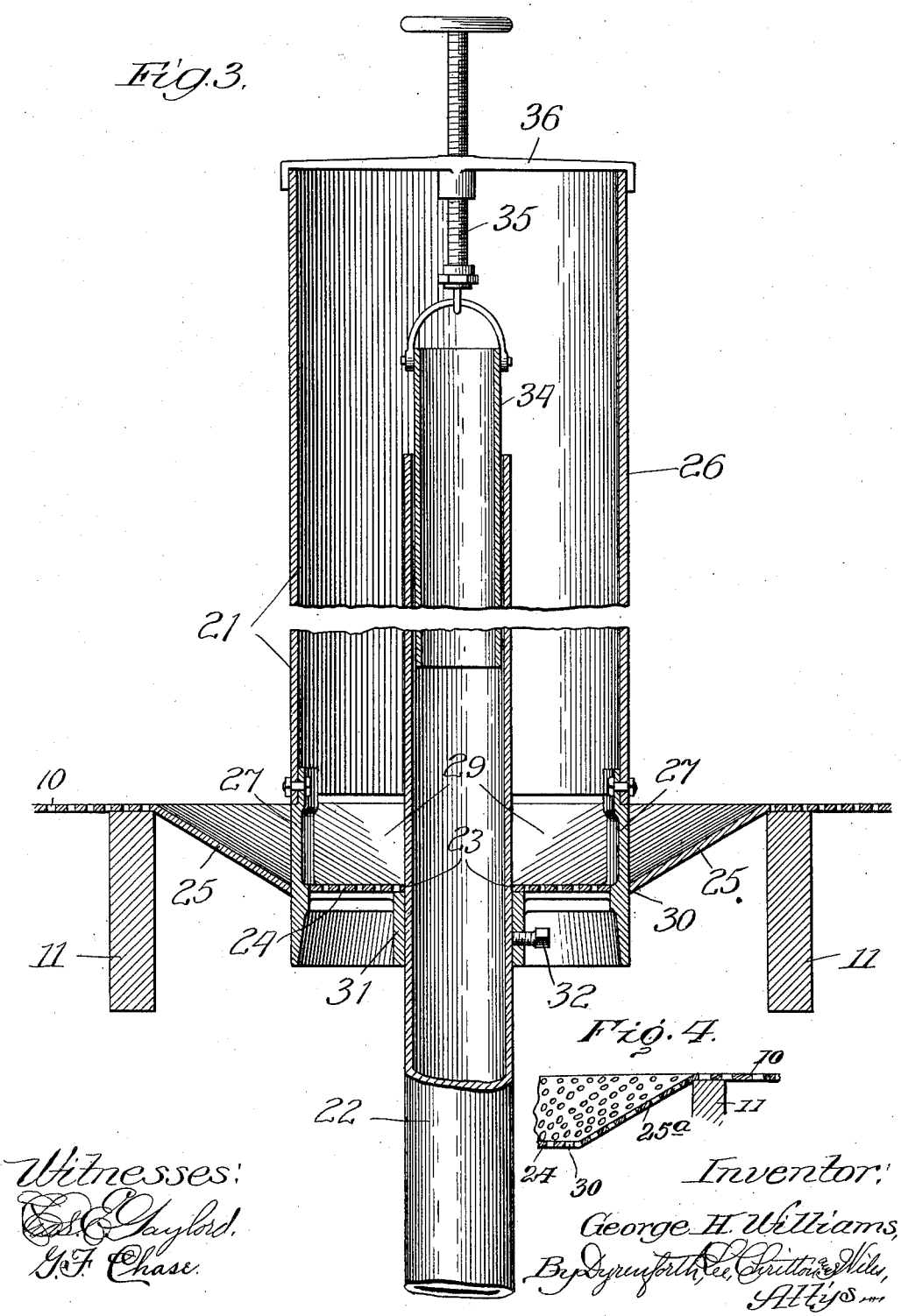

UNITED STATES PATENT OFFICE.

GEORGE H. WILLIAMS, OF CHICAGO, ILLINOIS.

ORE-JIG.

976,419.  Specification of Letters Patent.  Patented Nov. 22, 1910.

Application filed April 1, 1910. Serial No. 552,791.

*To all whom it may concern:*

Be it known that I, GEORGE H. WILLIAMS, a citizen of the United States, residing at Chicago, in the county of Cook and State of Illinois, have invented a new and useful Improvement in Ore-Jigs, of which the following is a specification.

My invention relates to improvements in the construction of ore-concentrating jigs of the class wherein the material to be treated is advanced along a stationary screen and subjected to water pulsations from the under side to stratify the ore constituents, according to their specific gravities, and permit the stratifications to be separately drawn off.

The present device is in the nature of an improvement, in the matter of certain details of construction, upon the ore, or coal-washing, jig, shown, described and claimed in my allowed application, Serial No. 529,958, filed November 26, 1909, my object being to better adapt the apparatus for the rapid and clean separation of certain ore constituents which differ but very slightly in specific gravity.

Referring to the accompanying drawings—Figure 1 is a longitudinal section through a plural-cell jig provided with my present improvements; Fig. 2, a somewhat enlarged section taken on line 2 in Fig. 1; Fig. 3, an enlarged broken section taken on line 3 in Fig. 2 and illustrating my present preferred construction of draw-off; and Fig. 4, a broken section illustrating a modified detail of the construction shown in Fig. 3.

The apparatus shown in Fig. 1 is constructed with three cells 5, 6 and 7 having hopper-bottoms 8 with outlet-pipes 9. Overlying each cell is a substantially horizontal screen 10 resting upon cross-pieces 11. The partition 12 between the cells 5 and 6 is somewhat higher than the partition 13 between the cells 6 and 7, the latter partition in turn being somewhat higher than the end-wall 14. At opposite sides of the screens 10 are compartments, or cylinders, 15 containing plungers 16. The compartments 15 are separated from the screens by the partitions 17 being open at the top and communicating at their lower sides with the cells beneath the screens 10. The plungers 16 are actuated by eccentrics 18 on shafts 19 which are driven from a power-shaft 20 to move the plungers coincidently. In each cell, in the position shown, is a pair of draw-offs 21, each communicating with a separate discharge-pipe 22. Each pipe 22 terminates at its upper end in a plane some distance above the screen 10, passing through an opening 23 in the latter. The part of the screen surrounding the pipe 22 is dished, preferably as shown, to present the annular horizontal perforate base 24 surrounded by a preferably inclined, and preferably imperforate, annular section 25. The sections 24, 25 may be integral with the screen 10 in each instance, or they may be separate therefrom, and positioned relatively thereto as shown. Surrounding the upper end-portion of each pipe 22 is a selector-sleeve 26 resting upon legs 27 spaced apart to present openings 29 around the lower end of the sleeve. These inlet-openings 29 extend from the screen-section 24 slightly above the plane of the surrounding upper horizontal or main screen 10. The legs 27 pass through slots 30 provided in the screen at the circumference of the part 24, the legs rising from a spider 31 fastened to the pipe 22, as by means of the set-screw 32 shown.

It will be understood that the sleeve 26 is supported in its raised position upon the legs 27 which are an integral part of a spider 31. If it is desired to lower the tops of the openings 29 from the position shown, this may be done by lowering the spider upon the pipe 22 without disturbing the screen, which is held stationary upon the cross-pieces 11. The material to be treated is fed through the chute 33 on to the screen 10 and the incoming material naturally forces along that deposited upon the screen. The plungers of each cell work up and down simultaneously, forcing water contained in the cells beneath the screen upward through the latter and through the material deposited upon the screen. In practice, the supply from the chute 33 is regulated with reference to the capacity of the device, and the operations of the plungers, to render the pulsations and overflow approximately uniform.

The apparatus, constructed as shown and described, is particularly well adapted for treating mined coal containing iron pyrites, slate and bone coal, as well as the higher grade, or coking, coal, which is of particular value. The material after being crushed to the desired mesh is fed with water through the chute 33 and as it advances along the screen 10 is subjected to the water pulsations from underneath. The agitation of the mass thus effected tends to stratify it according to the specific gravities of its different materials, the finer particles of iron pyrites passing through the screen and the larger particles thereof spreading over the screen to form a jig-bed. The slate will tend to form in a layer over that of the iron pyrites, the bone coal will tend to form a layer above the slate, while the commercial coal, which is of lighter specific gravity than the bone coal, will tend to spread and form a top layer. The iron pyrites, being quite materially heavier than the slate, will, in practice, tend to separate itself into a well-defined bottom layer before the mass in its advancement reaches the first pair of draw-off devices 21.

It will be understood that the force of the pulsations of water upward through the screen 10 lifts all, or practically all, of the material bodily until the under surface of the layer of slate reaches, approximately, the plane of the top of the partition 12. Thus, the partly-stratified coal, bone coal and slate will be intermittently swept over the partition 12, while in each descent of the material part of the lower stratum of iron pyrites will move on to the annular slide or chute formed by the impervious part 25 of the screen and be carried through the openings 29 onto the pervious surfaces 24 of the screen. It will be understood that the pulsations of water through the screen-sections 24 raise the material entering the selector-sleeves 26 to the top of the pipe 22, causing its intermittent discharge through the latter. It is necessary, or at least desirable, in practice, to regulate the height of the pipes 22, in each instance, and this I accomplish in the same way as in my former construction, by providing an adjustable pipe-extension 34, supported by a screw 35 passing through a cross-bar 36 resting on the top of the selector sleeve. The forces which operate upon the material, and all of which have to be considered in the adjustment of parts, are the advancing force effected by the material fed through the chute 33, the effect of the abutments 12, 13 and 14, the wash of material over the said abutments, the pulsations from underneath against the jig-beds, the rise and fall of the material thus produced and the withdrawing of the material into the selector-sleeves. I have found, in practice, that a particularly clean separation is produced by providing the inclined and imperforate screen-sections 25, and the lower parts of the openings 29 into the selector-sleeves, at a lower level than the plane of the main screen-section 10. For a short distance around the base-portions of the selector-sleeves the influence of the pulsations, owing to the imperforate sections, is not directed against the lower stratum to agitate it; this permits material of the lower stratum to be forced cleanly onto the inclined surfaces 25 which direct it into the selector-sleeves.

In the first cell 5 of the present construction, therefore, practically all the iron pyrites will be eliminated; in the second cell 6, where a slate jig-bed is formed, the latter will be eliminated; and in the third cell the bone coal will form the jig-bed and the commercial coal will be discharged therefrom through the discharge-chute 37.

My present improvements, which deal especially with the construction of the selector-sleeves and attendant mechanism, may be applied to all the cells as described, though they are of particular value in connection with the third cell when dealing with mined coal containing bone coal or other material which it is desired to eliminate and which is of very nearly the specific gravity of the coking coal which it is desired to save in as pure a state as possible.

I may state that with draw-off means constructed and adjusted substantially as shown I have effected a clean separation on a commercial scale between mined coal constituents having a difference between them in specific gravity of less than one-twentieth of one per cent.

As before stated, I prefer to provide the inclined chute-sections of the screen imperforate, though a more or less saving of water will be effected in operation if the said sections are perforated. A somewhat cleaner and more rapid separation, with attendant increased capacity, is effected in practice by providing the chute-sections imperforate, and it is only where this saving of water in operation is a serious consideration that perforated chute-sections 25ª are substituted, as illustrated in Fig. 4. The upward pulsations in the selector-sleeves raise the level of the material therein above the tops of the draw-off pipe-extensions 34, causing an outflow through the latter, thereby reducing the level in the sleeves below that of the material resting on the screens 10. This naturally produces a rush of material from this lower stratum into the sleeves through the openings 29 during each rise of the jig-bed.

What I claim as new and desire to secure by Letters Patent is—

1. In a jig of the character described, the combination of a cell, a main screen in the upper part of the cell upon which the mass to be treated is fed and along which it is advanced, means for causing water to pulsate through the screen from its under side to stratify different materials of the mass and causing the lower stratum to form a jig-bed, and means for discharging material of a lower stratum from the jig, comprising a selector-sleeve, a porous screen-section beneath the sleeve at a lower level than the said main screen, an inclined chute extending between the main screen and said screen-section, the sleeve having an inlet-opening in its lower end-portion, and draw-off means within the sleeve above the level of said inlet-opening.

2. In a jig of the character described, the combination of a cell, a main screen in the upper part of the cell upon which the mass to be treated is fed and along which it is advanced, means for causing water to pulsate through the screen from its under side to stratify different materials of the mass and cause the lower stratum to form a jig-bed, and means for discharging material of a lower stratum from the jig, comprising a selector-sleeve, a porous screen-section beneath the sleeve at a lower level than the said main screen, an inclined imperforate chute extending between the main screen and said screen-section, the said sleeve having an inlet-opening in its lower end-portion, and draw-off means within the sleeve above the level of said inlet-opening.

GEORGE H. WILLIAMS.

In the presence of—
R. A. RAYMOND,
F. D. DAUPHIN.